Nov. 26, 1963    R. E. JENKINS    3,111,835
HYDROCARBON GAS CHROMATOGRAPHY AND APPARATUS
Filed Nov. 30, 1959    2 Sheets-Sheet 1

INVENTOR.
Ralph E. Jenkins
BY
*Curtis, Morris & Safford*
ATTORNEYS 3,111,835
HYDROCARBON GAS CHROMATOGRAPHY
AND APPARATUS
Ralph E. Jenkins, Irving, Tex., assignor to Core Laboratories, Inc., Dallas, Tex., a corporation of Delaware
Filed Nov. 30, 1959, Ser. No. 856,302
1 Claim. (Cl. 73—23)

This invention relates to a method and apparatus for analyzing mixtures of hydrocarbon gases.

One of the principal applications for the invention is the analysis of the hydrocarbon content of drilling mud which is circulated into and out of an oil or gas well during the drilling thereof by the rotary method, in order to ascertain the presence of hydrocarbons in the subterranean strata being traversed by the drilling bit.

Shortly after the introduction of rotary drilling, it was recognized that the drilling mud returning to the top of the well often contained detectable quantities of any hydrocarbons which were present in the pore spaces of the underground formations penetrated by the bore hole. Initially, only the crudest methods were employed to detect these hydrocarbons, including visually inspecting the mud for any film of oil floating on its surface, or for presence of bubbles of gas in the mud, and also smelling and tasting the mud. Later, more sensitive methods of detection were developed, including the use of ultraviolet light for visual examination for oil and the use of a hot wire filament for gas detection.

Only recently, further improved methods of gas detection have been introduced to permit differentiation between the various individual hydrocarbon components which are present in the mixture of gases evolved from the mud. One of these methods, which involves the use of the mass spectrometer, while affording good results, requires very costly and cumbersome equipment. The present invention relates to another such method, which is based upon the principle of chromatography.

In gas chromatography, the component gases of a mixture are separated by transporting with a carrier gas a sample of the mixture through a column filled with a pulverulent or porous material which retards the passage of the several component gases to different degrees which are roughly correlated with the logarithms of their respective molecular weights. This retention effect is generally attributed to such factors as surface adsorption, chemical solubility, molecular sieving, hydrogen bonding, or to various combinations thereof. The chromatographic columns are of two general classes, namely the "adsorbing" columns, which are filled with dry, crushed and graded material, and the "partitioning" columns, in which the solid material is coated with the liquid.

The component gases of the injected samples are eluted from the output end of the column at different times, and thus may be separately measured by a gas detector, for example a hot-wire detector of either the catalytic combustion or thermal conductivity types. The column is calibrated by passing known pure gases through it and measuring their retention times.

Heretofore, in the chromatographic analysis of mixtures of hydrocarbon gases, it has been necessary to maintain the flow in the forward direction through the column for a period of time sufficient for all the detectable components of the mixture to be eluted from the column in order to ready the column for the analysis of the next sample, or, as an alternative, it has been necessary to maintain the flow in the forward direction through the column for a period of time sufficient for the desired hydrocarbon components to be completely eluted from the column and measured in the gas detector, then the flow has been reversed for a slightly longer period of time in order to backflush any heavier components completely from the column directly to the atmosphere, thus eliminating any possibility of detection or analysis of these components, in order to ready the column for the anlysis of the next sample. The total time required for analysis of each sample has therefore been quite substantial if the relative concentrations of higher hydrocarbons was being measured. Moreover, it has been difficult to obtain an accurate reading of heavier components, because they are present in relatively lesser concentrations and because during their longer retention in the column, their molecules are subject to greater statistical spreading and thus do not form as sharp a peak in the detector output as do the lighter, more rapidly eluted gases.

The present invention provides a novel technique of analysis in which the flow in the forward direction through the column is maintained only for a time sufficient to permit a desired number of the lighter hydrocarbon components of the sample to be eluted and measured; then, while all the heavier ends remain in the column, the flow is reversed to backflush them from the column, with the backflushed gas mixture being conducted to the gas detector for analysis. When the forward flow is terminated, the heavier hydrocarbon components which remain in the column are spaced along the length of the column in the order of their molecular weights, with the lighter of such components having travelled faster and farther during the forward flow and therefore being nearer the output end. During the reverse flow, the lighter components will again travel faster and farther in the same ratio as they did during the forward flow, and all of the components in the column will thus arrive back at the input end approximately simultaneously. These recombined heavier components will form a higher peak in the output of the gas detector than any of them would individually, so that the possibility of their escaping detection is substantially eliminated. The time of both forward and reverse flow is considerably reduced while still permitting a reading to be taken on the heavier hydrocarbons. Moreover, during the measurement of the heavier ends, the column is being purged to prepare it for the next sample cycle.

Figure 1:
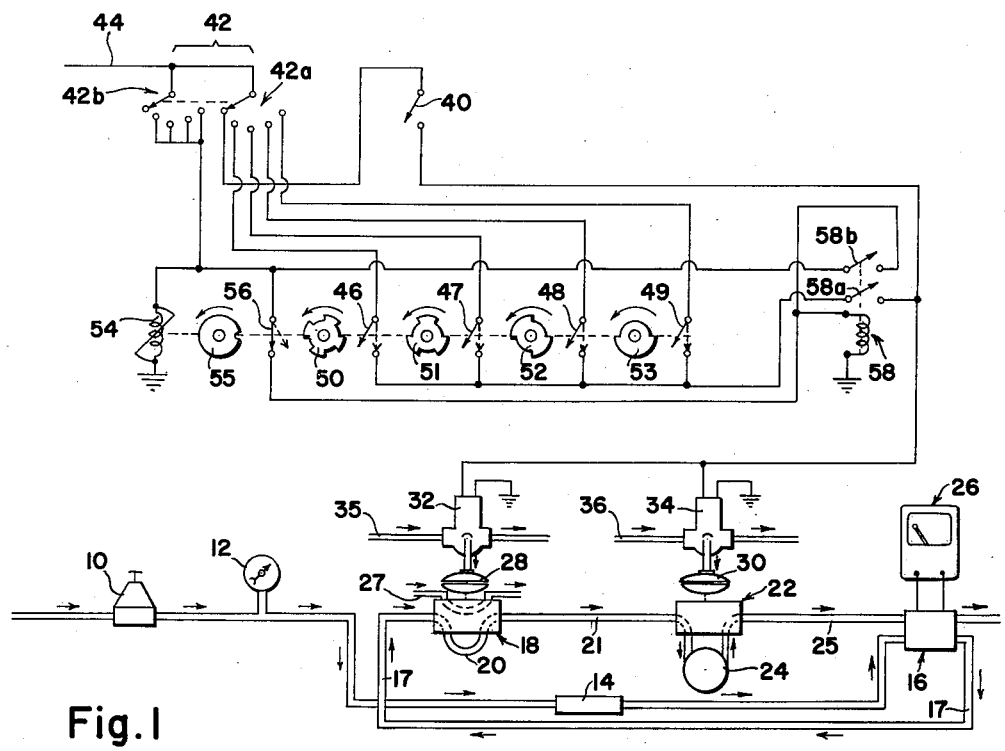
FIGURE 1 is a schematic diagram of an illustrative chromatographic apparatus embodying features of the present invention.

In FIGURE 1 the apparatus is shown in operation in the forward flow phase of the cycle, with the arrows in the lower half of the figure indicating the direction of flow of the gas mixture during this phase. The carrier gas, for example air, is conducted from a pressure source, such as a bottle of compressed air, through a pressure regulating valve 10, a pressure gauge 12 and an orifice 14 to provide a constant rate of flow. This carrier gas is conducted past a reference or compensating filament in the gas detector 16 and then back around through the line 17 to the sample valve 18.

In the forward flow position of the sample valve, as shown in FIGURE 1, the carrier gas is directed through the sample loop 20 where it sweeps out the sample gas therein, and carries it through the line 21 to the backflush valve 22. In the forward flow position of the backflush valve 22, as illustrated in FIGURE 1, the carrier gas with the entrained sample mixture passes through the chromatographic column 24 in the forward direction, as indicated by the arrows, and then is conducted past a detector filament in the gas detector 16 and discharged to atmosphere.

The detector filament and the reference filament of the detector 16 are connected in opposite arms of a Wheatstone bridge circuit which in turn is connected to a recorder 26 to record the imbalance in electrical conductivity of the two filaments. As is well known, combustion takes place at the surface of the detector filament when the combustible components of the sample gas pass over it, raising the temperature of the filament and thereby increasing its electrical resistance, causing an imbalance of the bridge circuit and an indication on the recorder 26 proportional to the concentration of the combustible components.

Figure 2:
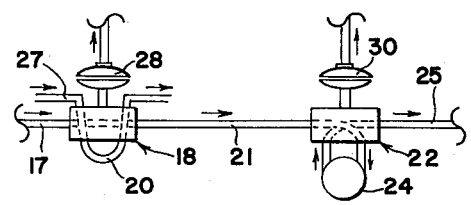
FIGURE 2 is a fragmentary portion of the schematic diagram of FIGURE 1 but showing the flow of gas through the sample valve and the backflush valve when these valves are set in different positions than those in which they are shown in FIGURE 1.

As shown in FIGURE 2, during the reverse flow phase of the cycle, the sample valve 18 connects the sample loop 20 to the line 27 extending from the source of the sample gas so that the sample loop is filled with a predetermined volume of the sample gas. At the start of the forward flow phase of the cycle, the sample valve 18 is switched to the position shown in FIGURE 1 causing the carrier gas to be routed through the sample loop 20 and to sweep out the charge of sample gas therein and carry it through the backflush valve 22 into the input end of the chromatographic column 24. All of the various components of the sample mixture thus enter the input end of the chromatographic column substantially simultaneously. However, due to the different retention times of these various components in the chromatographic column, they will arrive at the output end of the column at different times. As will be described more fully hereinafter, the time duration of the forward flow phase of the cycle is selected to permit a predetermined number of the lighter hydrocarbon components to be completely eluted from the column during the forward flow phase and detected in the detector 16 and their relative concentrations indicated by the recorder 26 while all of the heavier components still remain in the column.

At the conclusion of the forward flow phase of the cycle, the sample valve 18 and the backflush valve 22 are actuated to the positions shown in FIGURE 2 to initiate the reverse flow or "backflush" phase of the cycle. During this phase of the cycle, the sample valve 18 connects the carrier gas from the line 17 directly through the line 21 and to the backflush valve 22, while the backflush valve 22 reverses the connections to the chromatographic column 24 so that the carrier gas enters the output end of the column and flows toward its input end. The heavier hydrocarbon components which still remain in the chromatographic column at the start of the reverse flow phase of the cycle are thus backflushed by the carrier gas from the column and are carried through the line 25 to the detector 16. At the start of the reverse flow, these heavier components are spaced along the column in the reverse order of their molecular weights, with the lighter ones nearer the output end of the chromatographic column. During the reverse flow phase, these lighter components will again move faster than the heavier ones, so that all of the components remaining in the column will arrive back at the input end and be conducted to the detector 16 substantially simultaneously to form a single peak on the recorder 26. Thus grouped, the heavier components are much easier to detect than any of them would be separately.

The sample valve 18 and the backflush valve 22 are provided with pneumatic actuators 28 and 30, respectively, which are powered by compressed air from the lines 35 and 36 under the control solenoids 32 and 34. As may be seen, the two solenoids 32 and 34 are connected in parallel; when they are energized, the valves 18 and 22 are actuated to the positions shown in FIGURE 1 to cause flow in the forward direction as illustrated by the arrows in that figure. When the solenoids 32 and 34 are deenergized, the valves 18 and 22 are actuated to the positions shown in FIGURE 2 to cause flow in the reverse direction. The energizaiton of the valve control solenoids 32 and 34 is controlled by the electrical circuit appearing in the upper half of FIGURE 1. As may be seen in that figure, when the cycle selector switch 42 is set in its extreme clockwise or "manual" position, in which it is shown, the two solenoids 32 and 34 may be energized from the power line 44 by closure of a manual flow control switch 40. When the cycle selector switch 42 is set in any of its other four positions, to select an automatically controlled cycle, the right-hand section 42a of the cycle selector switch 42 connects the power line 44 through a selected one of four timer switches 46, 47, 48 and 49 and through the closed contacts 58a of a positioning relay 58 to the valve control solenoids 32 and 34. The timer switches 46–47 are respectively actuated by timer cams 50, 51, 52 and 53 driven by an electric motor 54 which is energized from the line 44 through the left-hand section 42b of the cycle selector switch 42 in any position of the switch 42 other than the "manual" position.

During each operating cycle, the timer switch selected by the cycle selector switch 42 is alternately closed and opened by its cam to alternately energize and deenergize the valve control solenoids 32 and 34 and cause flow through the chromatographic column first in the forward and then in the reverse direction. The four timer cams 50–53 are driven by the motor 54 at the same rotational speed; for example, in one typical embodiment of the invention, they make one revolution each six minutes. The cam 53 provides only one forward and one reverse flow phase in this total cycle, while the cam 52 provides two forward and two reverse flow phases, the cam 51 three forward and three reverse flow phases, and the cam 54 four forward and four reverse flow phases. In each case, the duration of the forward flow phase is slightly shorter than the duration of the reverse flow phase to insure that the heavier components remaining in the column at the end of the forward flow phase will be completely backflushed from the column during the reverse flow phase. Thus, the cam 53 provides a forward flow phase of approximately 178 seconds, the cam 52 a forward flow phase of approximately 87 seconds, cam 51 a forward flow phase of approximately 58 seconds and the cam 50 a forward flow phase of approximately 42 seconds. With a typical column as used in this embodiment of the apparatus, the 42-second forward flow phase provided by cam 50 permits sufficient time for methane only to be eluted from the column during the forward flow phase of the cycle; the 58-second forward flow phase provided by cam 51 provides sufficient time for both methane and ethane to be eluted; the 87-second forward flow phase provided by cam 52 permits sufficient time for methane, ethane and propane to be eluted; and the 178-second forward flow phase provided by cam 53 permits sufficient time for methane, ethane, propane and butanes to be eluted. In each case all of the higher hydrocarbons are backflushed from the column and measured together during the reverse flow phase.

The motor 54 also drives a positioning cam 55 which actuates a positioning switch 56 which is connected to control the relay 58. The winding of the positioning relay 58 is energized from the power line 44 when the cycle selector switch is set in some position other than the "manual" position and when the positioning switch 56 is closed by the positioning cam 55 at the start of a complete cycle. Once the relay 58 is energized, it is maintained energized through its holding contacts 58b until the cycle selector switch is switched to some other position, breaking the circuit from the line 44 through the holding contacts 58b to the winding of the relay. When the relay 58 is thus deenergized, it cannot again be energized until the positioning cam 55 again reaches the point corresponding to the beginning of the next complete cycle. It will thus be appreciated that if the cycle selector switch 42 is switched to a different position at an intermediate point in a cycle, the forward flow phase of the new cycle which has been selected cannot commence until the chromatographic column has been completely backflushed of any components remaining in it at the time the setting of the cycle selector switch is changed. This assures that there can be no false indication during the ensuing cycle due to components remaining in the column from the previous cycle.

Figure 3:
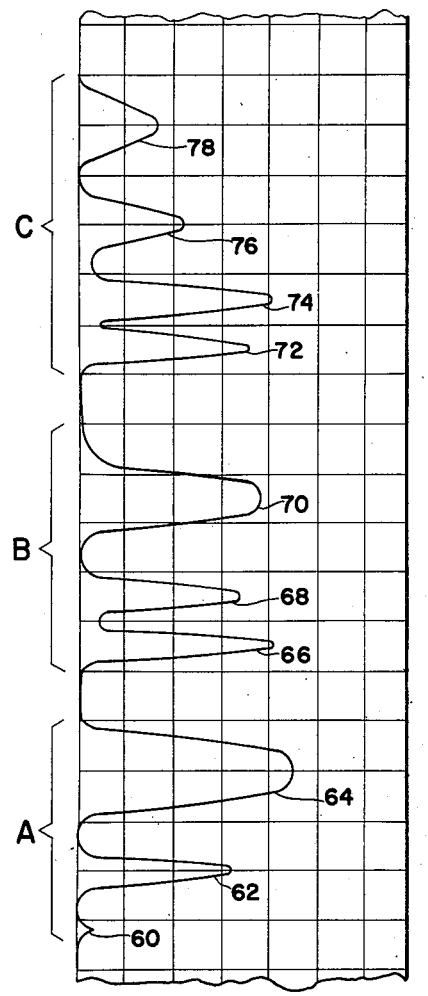
FIGURE 3 represents an illustrative chart formed by the apparatus shown in FIGURES 1 and 2.

FIGURE 3 is a somewhat idealized representation of a typical chart formed by the apparatus shown in FIGURES 1 and 2. The chart is formed on a sheet moving in the direction of the arrow, by a pen moving to the right from the base line at the left of the chart distances proportional to the concentrations of the combustible components passing through the detector 16 (FIGURE 1).

The portion of the graph designated by the letter A represents one cycle of operation with the cycle selector switch 42 (FIGURE 1) in such position as to select the cycle controlled by timer switch 46 and timer cam 50. The first small peak 60 on the curve is merely a switching transient. The peak 62 represents the relative concentration of methane, while the peak 64 represents the total relative concentration of all of the remaining heavier components. The portion of the graph designated B represents a single cycle with the cycle selector switch 42 (FIGURE 1) in the position to select timer switch 47 and timer cam 51. The peaks 66 and 68 represent the relative concentrations of methane and ethane respectively, while the peak 70 represents the total relative concentration of the remaining heavier components. The portion of the graph designated C represents a single cycle with the cycle selector switch 42 (FIGURE 1) set in the position to select timer switch 48 and timer cam 52. The peaks 72, 74 and 76 represent the relative concentrations of methane, ethane and propane respectively, while the peak 78 represents the total relative concentration of the remaining heavier components.

As will be appreciated, the concentrations of the respective components are determined not by the height of the peaks, but by the area beneath the peaks. For this reason, the chart speed is usually set somewhat slower than is indicated by FIGURE 3 to narrow the peaks and make their respective heights more nearly proportional to the relative concentrations of the components represented. However, to facilitate understanding, the chart of FIGURE 3 was pictured as though formed at a relatively high chart speed to give an appreciable width to the peaks and to indicate different degrees of statistical spreading generally proportional to the retention times of the respective components in the chromatographic column.

From the foregoing, it will be apparent that the present invention provides a practical, rapid and convenient means and method for separately measuring the respective concentrations of any selected number of the lighter hydrocarbon components in a gaseous mixture, and for automatically combining all of the heavier components and measuring their total concentration. However, it should be emphasized that the particular embodiment of the invention described herein and illustrated in the accompanying drawings is intended as merely illustrative of the principles of the invention, rather than as restrictive of the scope thereof or of the coverage of this patent which is limited only by the appended claim.

I claim:

Apparatus for analyzing a mixture of hydrocarbon gases, said apparatus comprising a chromatographic column, a source of carrier gas under relative pressure, a sample tube for holding a sample of said mixture of predetermined volume, a sample valve for selectively connecting said sample tube either to the source of said mixture or between said source of carrier gas and said column, a gas detector, a backflush valve for selectively connecting one end of asid column to said sample valve and the other end to said gas detector, or vice versa, electrically controlled means for actuating said sample valve and said backflush valve, a relay for controlling said electrically controlled means, a plurality of timer switches, a plurality of timer cams for respectively actuating said timer switches at different intervals, a motor for driving said timer cams, and a selector switch for connecting any selected one of said timer switches to control said relay, whereby any of a plurality of operating cycles may be selected each having a forward flow phase and a reverse flow phase in the forward flow phase of which the carrier gas flows through the sample tube to cause the sample to be entrained therein and then through said column and said gas detector in one direction for a period of time sufficient to permit a certain number of the lighter hydrocarbon components of the sample, according to the particular cycle selected, to be eluted from said column and measured by said gas detector while the heavier components remain in said column, and in the reverse flow phase of which the carrier gas flows through said column in the reverse direction for a period of time sufficient to cause said heavier components to be backflushed from said column and measured by said gas detector, while said sample tube is connected to the source of said sample to be charged with another sample, holding contacts actuated by said relay, a positioning switch connected in parallel with said holding contacts and in series with the contacts of said selector switch between the winding of said relay and a source of electrical current, a positioning cam arranged to actuate said positioning switch at intervals corresponding to integral multiples of the period of each of said cycles and when each of said timer cams is positioned at a point corresponding to the beginning of a forward flow phase of its respective cycle, whereby said relay is actuated to prevent forward flow through said column whenever said selector switch is actuated to select a different cycle and forward flow cannot be resumed until after said column has been completely backflushed and said positioning cam next actuates said positioning switch.

References Cited in the file of this patent

UNITED STATES PATENTS

| | | |
|---|---|---|
| 2,841,005 | Coggeshall | July 1, 1958 |
| 2,868,011 | Coggeshall | Jan. 13, 1959 |
| 2,981,092 | Marks | Apr. 25, 1961 |

OTHER REFERENCES

"The Application of Gas Chromatography to the Analysis of Natural Gas," by J. A. Favre et al., The Journal of the Institute of Petroleum, Vol. 45, No. 422, page 29A, February 1959.

An article entitled "Gas Partition Analysis of Light Ends in Gasolines," by Lichtenfels et al., Analytical Chemistry, Vol. 28, No. 9, September 1956.

An article entitled "Gas-Liquid Partition Chromatography," by Lichtenfels et al., Analytical Chemistry, Vol. 27, No. 10, October 1955.